United States Patent
Boutinon et al.

(10) Patent No.: US 8,174,687 B2
(45) Date of Patent: May 8, 2012

(54) DEVICE AND A METHOD FOR MEASURING A CAMBER GEOMETRICAL CHARACTERISTIC OF AN OPHTHALMIC LENS

(75) Inventors: Stephane Boutinon, Charenton-le-Pont (FR); Philippe Pinault, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 114 days.

(21) Appl. No.: 12/628,074

(22) Filed: Nov. 30, 2009

(65) Prior Publication Data
US 2010/0134789 A1 Jun. 3, 2010

(30) Foreign Application Priority Data
Dec. 2, 2008 (FR) ...................... 08 06761

(51) Int. Cl.
*G01B 9/00* (2006.01)
(52) U.S. Cl. ...................... 356/124; 356/127
(58) Field of Classification Search .......... 356/123–127; 351/41, 42, 177, 200, 204, 246, 221, 171; 33/507; 451/42–43; 250/215; 382/100
See application file for complete search history.

(56) References Cited

U.S. PATENT DOCUMENTS

| | | | |
|---|---|---|---|
| 5,855,074 A | 1/1999 | Abitbol et al. | |
| 2003/0015649 A1 | 1/2003 | Levecq et al. | |
| 2007/0146687 A1 | 6/2007 | Divo et al. | |
| 2007/0273870 A1 | 11/2007 | Divo | |
| 2007/0291259 A1 | 12/2007 | Levecq et al. | |
| 2008/0062410 A1* | 3/2008 | Divo et al. | 356/126 |
| 2008/0232637 A1 | 9/2008 | Laurent | |

FOREIGN PATENT DOCUMENTS

| | | |
|---|---|---|
| DE | 102 31 343 | 1/2004 |
| EP | 1 605 241 | 12/2005 |
| FR | 2 879 736 | 6/2006 |
| FR | 2 880 118 | 6/2006 |

OTHER PUBLICATIONS

French Search Report dated Jul. 17, 2009, from corresponding French application.

* cited by examiner

*Primary Examiner* — Tri T Ton
(74) *Attorney, Agent, or Firm* — Young & Thompson

(57) ABSTRACT

A device for measuring at least one camber geometrical characteristic of an ophthalmic lens provided on at least one of its faces with at least one position-identifying mark, the device including a support for the ophthalmic lens, and on opposite sides of the support, firstly lighting element for lighting the ophthalmic lens along at least two different lighting directions, and secondly acquisition and analysis element for acquiring and analyzing the light transmitted by the ophthalmic lens, the analysis element being adapted to identify shadows of the mark when lighted in the at least two lighting directions, and to deduce from their positions a measured value for the camber geometrical characteristic of the ophthalmic lens.

20 Claims, 1 Drawing Sheet

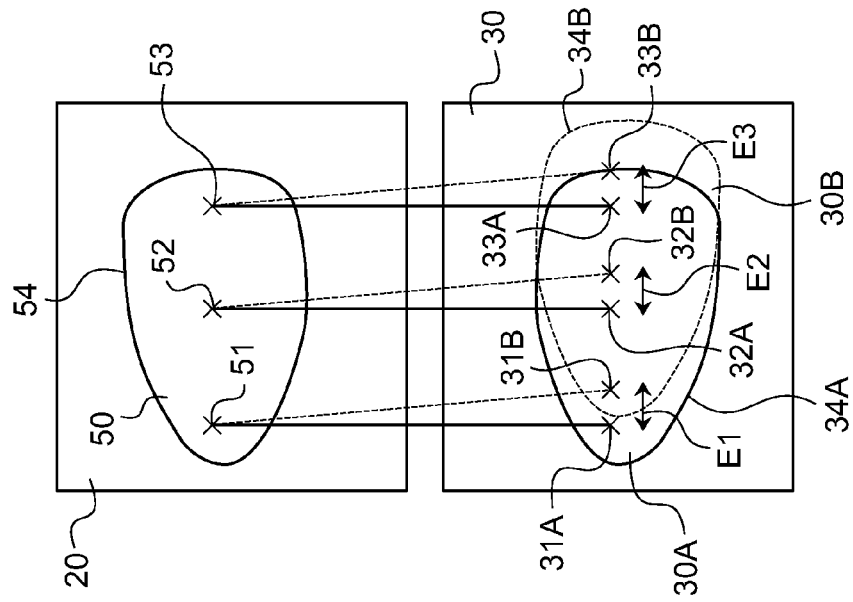
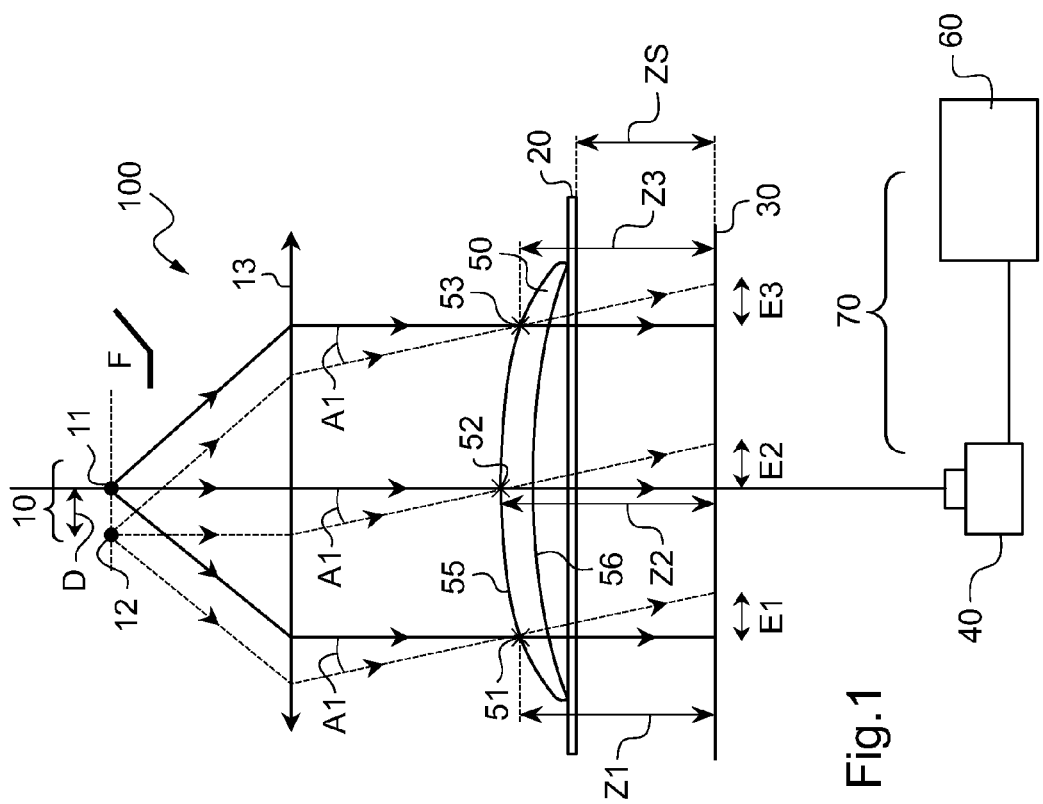

DEVICE AND A METHOD FOR MEASURING A CAMBER GEOMETRICAL CHARACTERISTIC OF AN OPHTHALMIC LENS

TECHNICAL FIELD TO WHICH THE INVENTION RELATES

The present invention relates to the field of optical metrology, and it relates more particularly to a device for determining at least one camber geometrical characteristic of an ophthalmic lens.

The device may advantageously be incorporated in the appliances used by opticians for mounting ophthalmic lenses in eyeglass frames, such as appliances for reading the outline of a frame or of presentation lenses, or appliances for optically centering and blocking an ophthalmic lens.

TECHNOLOGICAL BACKGROUND

Knowledge of the camber of an ophthalmic lens is important in mounting said ophthalmic lens in an eyeglass frame. This information is used in particular for performing the various steps of such mounting, such as centering the ophthalmic lens relative to the frame, managing the cycles of feeling the ophthalmic lens, drilling or chamfering the ophthalmic lens, measuring the power of said ophthalmic lens and also its prismatic correction (for correcting the prismatic effects of the lens).

It may also be important to verify that the camber of the ophthalmic lens is compatible with the camber of the frame that is to receive it, or to analyze the difference in camber between the left and right ophthalmic lenses of a given pair of eyeglasses.

Finally, on receiving an ordered lens, this information enables the optician to verify that the camber of the received lens does indeed correspond to the desired camber.

At present, the camber of an ophthalmic lens is measured by means of a dedicated appliance known as a spherometer. The principle of such a spherometer is described for example in document U.S. Pat. No. 2,052,153. However that measurement requires rather lengthy manipulation of the ophthalmic lens, thereby increasing the risk of damaging it. In addition, it requires a dedicated appliance to be used. Finally, the use of such a spherometer gives a measurement of the camber that is poorly reproducible since the accuracy of the measured value for the camber depends on how the spherometer is positioned on the ophthalmic lens, and in particular on the transverse inclination of the spherometer relative to the ophthalmic lens during measurement.

There also exist measurement appliances, e.g. appliances for measuring the outline or for centering that also incorporate a spherometer, with one such product being sold under the trademark "Opera Scan" by the supplier Indo. Nevertheless, those measurement appliances are of complex design and require special manipulation of the ophthalmic lens.

OBJECT OF THE INVENTION

The object of the present invention is to provide a device that is simple and of low cost and that enables the camber of an ophthalmic lens to be determined automatically after short handling time and with accuracy that is acceptable, without making contact with the ophthalmic lens and thus without running the risk of damaging it.

To this end, the invention provides a device for determining at least one camber geometrical characteristic of an ophthalmic lens, said ophthalmic lens being provided on at least one of its faces with at least one position-identifying mark, said device including a support for said ophthalmic lens, and on opposite sides of the support, lighting means for lighting said ophthalmic lens along two different lighting directions, and acquisition and analysis means for acquiring and analyzing the light transmitted by said ophthalmic lens, said analysis means being adapted to identify shadows of said at least one mark when lighted along said at least two lighting directions, and to deduce therefrom at least said camber geometrical characteristic of the ophthalmic lens.

The device of the invention may thus advantageously be incorporated in an appliance for reading the outline of the ophthalmic lens or a centering appliance, and it acts automatically and without making contact with the lens, to provide an accurate measurement of the camber of the ophthalmic lens by means of a manipulation that is simple and fast. The risks of damaging the ophthalmic lens during said measurement are thus reduced.

According to a first advantageous characteristic of the device of the invention, it includes a projection screen and its acquisition and analysis means are adapted to identify shadows of said at least one mark projected onto said projection screen, and to deduce from the positions of the shadows the measured value of said camber geometrical characteristic.

The projection screen advantageously makes it possible to view the shadows projected by the mark lighted in at least two different lighting directions. The acquisition means may then serve merely to capture one or more images of the projection screen.

According to another advantageous characteristic of the device of the invention, said lighting means include at least two point light sources.

Two point light sources enable said ophthalmic lens to be lighted simply and inexpensively in two different lighting directions.

In which case, advantageously, each of said point light sources is collimated to form a light beam oriented along one of said lighting directions.

Collimating each source serves advantageously to move it to infinity from an optical point of view: after collimation, each of the two sources becomes equivalent to a source emitting a parallel light beam in a given direction. Each of the two sources then lights the mark and the lens in a single lighting direction. This step is described in greater detail below.

Alternatively, said lighting means comprise a single light source with a characteristic dimension greater than 5 millimeters.

Since this light source presents a large extent, it lights the mark on the ophthalmic lens along different lighting directions.

According to another advantageous characteristic of the invention, the acquisition and analysis means are adapted to calculate the measured value of said camber geometrical characteristic as a function of the refractive power of the ophthalmic lens along a meridian of said ophthalmic lens passing via said mark.

The accuracy of the measurement of the camber of the ophthalmic lens as obtained in this way is improved.

According to another advantageous characteristic of the device of the invention, the acquisition and analysis means are adapted to compare said measured value of the camber geometrical characteristic of the ophthalmic lens with a predetermined value.

Thus, by way of example, the device itself compares the measured value of the camber of the ophthalmic lens directly with its value as specified by the manufacturer, as ordered by the optician, or with a value that is predetermined as a function of the frame selected by the wearer. The optician can thus ensure that the ophthalmic lens is capable of being mounted in the selected frame while taking account of the flexibility thereof, for example.

According to another advantageous characteristic of the device of the invention, the device includes warning means that are activated when said comparison shows a difference between said measured and predetermined values that exceeds a predetermined threshold.

This predetermined threshold may in particular be determined as a function of the material of the frame.

Thus, if the measured value of the camber of the ophthalmic lens is for example incompatible with being mounted on the selected frame, the optician is warned automatically.

The invention also provides a method of measuring at least one camber geometrical characteristic of an ophthalmic lens, the method comprising the following steps:

providing said ophthalmic lens with at least one position-identifying mark;
lighting said ophthalmic lens along at least two different lighting directions;
acquiring shadows of said at least one mark on said at least two lighting directions; and
deducing therefrom a measured value for said camber geometrical characteristic of the ophthalmic lens.

Such a method is implemented simply and requires little manipulation of the ophthalmic lens.

According to a first advantageous characteristic of the method of the invention, the shadows of said at least one mark are formed on a projection screen, and the measured value of said camber geometrical characteristic of the ophthalmic lens is deduced from the positions of said shadows.

The positions of the shadows cast onto the projection screen are determined accurately by image processing and they enable the value of the camber of the ophthalmic lens to be determined quickly and accurately.

According to another advantageous characteristic of the method of the invention, said ophthalmic lens is provided with at least one mark situated in the vicinity of the top of said ophthalmic lens or of the center of its outline.

Thus, the optician needs to put only one mark into place, in a manner that is simple and fast.

According to another advantageous characteristic of the method of the invention, said ophthalmic lens is provided with at least four arbitrary marks.

The optician can thus select the marks randomly without taking care in their relative positioning or their positioning relative to the lens.

Furthermore, the optician can then make use of marks that are incorporated in the ophthalmic lens, such as for example the so-called mounting marks of progressive ophthalmic lenses that are formed on the lens in order to identify its optical frame of reference. There is then no need to add other marks on the ophthalmic lens.

According to another advantageous characteristic of the method of the invention, the measured value for said camber geometrical characteristic is compared with a predetermined value; and a warning signal is issued when said comparison reveals a difference between the measured and predetermined values that is greater than a predetermined threshold.

The optician is informed quickly and automatically about any problem of incompatibility between the measured value for the camber of the ophthalmic lens and its expected value or the lens camber value that is acceptable for a given frame.

DETAILED DESCRIPTION OF AN EMBODIMENT

The following description with reference to the accompanying drawing given by way of non-limiting example makes it clear what the invention consists in and how it can be reduced to practice.

In the accompanying drawing:

FIG. 1 is a diagrammatic profile view of the device of the invention; and

FIG. 2 is a diagrammatic exploded view from above of a portion of the FIG. 1 device.

As shown in FIG. 1, in this example, the device 100 of the invention for measuring at least one camber geometrical characteristic of an ophthalmic lens comprises a support 20 that receives an ophthalmic lens 50.

In this example, the support 20 is formed by a plate that is transparent and sufficiently fine to ensure that the light rays that pass through it are deflected little. By way of example, it is made of glass or of transparent plastics material.

In this example, the ophthalmic lens 50 is placed directly on the support 20. Alternatively, an intermediate tripod could be provided resting on said support and receiving the ophthalmic lens.

The support may also be provided with silk-screened patterns or it may include patterns that are activatable and deactivatable. This may be achieved by using a screen of the liquid crystal display (LCD) type or the equivalent. The presence of such patterns makes it possible to measure the power, centering, and/or axis orientation characteristics of said ophthalmic lens, as described for example in document FR 2 878 979 or in its equivalent US 2007/273870.

The ophthalmic lens 50 is provided with at least one position-identifying mark 51, 52, 53.

In the example shown in FIG. 1, it is provided on its front face 55 with three marks 51, 52, and 53 in alignment on one of its meridians.

The marks 51, 52, and 53 in this example are temporary marks, e.g. made by marking with paint or by placing stickers on the front face 55 of the ophthalmic lens 50.

Alternatively, it is possible to envisage placing the marks on the rear face 56 of the lens 50.

Alternatively, the marks on the ophthalmic lens may be permanent marks, e.g. made by etching the ophthalmic lens. By way of example, such marks are already incorporated in an ophthalmic lens for identifying zones or points that are optically remarkable, e.g. the optical center of the ophthalmic lens. It is also possible, for example, to make use of the permanent marks on an ophthalmic lens that are used for performing frontofocometer measurements.

The outline 54 (see FIG. 2) of the ophthalmic lens 50, or the lines of demarcation between two zones of different focal lengths may also be used as permanent position-identifying marks of the ophthalmic lens 50.

Beside the support 20 that receives the ophthalmic lens 50, the device 100 includes lighting means 10 for lighting the ophthalmic lens 50 in at least two different lighting directions.

In this example, the lighting means 10 comprise two point light sources 11 and 12, e.g. two light-emitting diodes (LEDs). They are preferably placed in a plane parallel to the support 20 for the ophthalmic lens 50.

A first one 11 of the two light sources 11 and 12 preferably lights the ophthalmic lens 50 in a direction that is parallel to the optical axis thereof.

Both light sources 11 and 12 are preferably collimated.

For this purpose, a collimation lens 13 is used, for example, which lens is positioned in such a manner that both of the light sources 11, 12 lie in the focal plane P of the collimator lens 13. Under such conditions, the light rays emitted by each light source 11 and 12 and passing through the collimator lens 13 emerge therefrom in a direction that depends only on the position of the corresponding light source 11, 12 relative to the optical axis of the collimator lens 13. All of the light rays emitted by a given light source 11, 12 thus emerge in a common direction so as to form a parallel light beam.

The light sources 11 and 12 as collimated in this way are equivalent to point light sources placed at an infinite distance from the ophthalmic lens 50 that is to be lighted.

On the other side of the support 20, the device 100 also includes acquisition and analysis means 70 for receiving the light transmitted by the ophthalmic lens, these means comprising a camera 40 associated with a computer 60.

Specifically, the computer 60 comprises an electronics card that is designed and programmed to execute the functions described below.

A translucent projection screen 30, e.g. made of ground glass, is placed between the support 20 and the camera 40. The projection screen 30 is plane and is preferably positioned at a rather short distance from the support 20, e.g. a distance that is less than or equal to 50 millimeters. It is placed parallel to the support 20 of the ophthalmic lens 50.

Alternatively, it is possible to envisage having a projection screen 30 that presents a curved surface.

As shown diagrammatically in FIG. 2, when the ophthalmic lens 50 is lighted by each of the light sources 11 and 12, a shadow 30A, 30B of the ophthalmic lens 50 is projected onto the screen 30. This shadow 30A, 30B cast by the ophthalmic lens 50 includes shadows 31A, 32A, 33A, 31B, 32B, and 33B of each of the marks 51, 52, and 53 of the ophthalmic lens 50. It also includes shadows 34A, 34B of the outline 54 of the ophthalmic lens 50.

The means 70 for acquiring and analyzing the light transmitted by the ophthalmic lens 50 are adapted to identify the shadows 31A, 32A, 33A, 31B, 32B, and 33B of the marks 51, 52, and 53 projected onto the screen 30 and to deduce from the positions of the shadows 31A, 32A, 33A, 31B, 32B, and 33B a measured value for a camber geometrical characteristic of the ophthalmic lens 50.

For this purpose, the images of the projection screens 30 captured by the camera 40 are processed by the computer 60, as described below.

Alternatively, the camera may capture directly the shadow cast of the ophthalmic lens, e.g. by means of a sensor of large size or by a device made up of a plurality of small sensors of the charged-coupled device (CCD) type making up a strip used for scanning an acquisition surface. By way of example, such a strip of sensors may be moved in translation over the acquisition surface. The shadow of the ophthalmic lens projected onto the acquisition surface scanned by the strip of sensors is then captured directly.

In the measurement method in accordance with the invention, the computer 60 controls lighting by each of the light sources 11 and 12 so as to light the ophthalmic lens 50 with its marks 51, 52, and 53 in two lighting directions that are different.

As shown diagrammatically in FIG. 2, the shadows 31A, 32A, and 33A projected onto the screen 30 of the marks 51, 52, and 53 as lighted by the first light source 11 (continuous lines) are offset from the shadows 31B, 32B, and 33B of the marks 51, 52, and 53 as lighted by the second light source 12 (dashed lines). Likewise, the shadows 34A and 34B projected onto the projection screen 30 of the outline 54 of the ophthalmic lens 50 as lighted by each of the two light sources 11, 12 are offset relative to each other.

The computer 60 controls the capturing of two images of the projection screen 30 as lighted by each of the two light sources 11 and 12 individually.

A first image of the projection screen 30 is captured when the first light source 11 is on and the second light source 12 is off: it thus has the images of the shadows 31A, 32A, and 33A as projected by the first light source 11. A second image of the projection screen 30 is captured when the second light source 12 is on and the first light source 11 is off: it thus has the images of the shadows 31B, 32B, and 33B as projected by the second light source 12.

Only one shadow 31A, 32A, 33A, 31B, 32B, or 33B of each of the marks 51, 52, and 53 is thus present in each captured image, and the position of each shadow 31A, 32A, 33A, 31B, 32B, and 33B can be determined very accurately.

Alternatively, provision may also be made for the computer 60 to control capturing a single image of the projection screen 30 that includes both shadows of each of the marks 51, 52, and 53 as projected by both light sources 11 and 12 when they are switched on together.

Thereafter, the computer 60 determines the positions of the shadows 31A, 32A, 33A, 31B, 32B, and 33B of the marks 51, 52, and 53 on each captured image by processing the images.

To perform this image processing, the computer 60 begins by performing a step of determining the angle A1 that exists between the two directions in which the ophthalmic lens 50 is lighted.

By way of example, this angle A1 is determined by calculation on the basis of the relative position of the two light sources 11 and 12 and the focal length of the collimator lens 13.

Since the two light sources 11 and 12 are spaced apart by a distance D in the focal plane F of the collimator lens 13, and since the focal length of the collimator lens is equal to f, the angle A1 can be determined by applying the following formula:

$$A1 = a\tan(D/f)$$

where A tan represents the arc tangent function.

Alternatively, in order to determine the angle A1, an operator positions a pattern in the form of an opaque spot at a known distance L from the projection screen 30. The computer causes said pattern to be lighted in each of the two lighting directions and causes two images of the projection screen 30 to be captured, each including the shadow cast by said pattern in the corresponding lighting direction. The computer then processes these two images, as explained in greater detail below, to determine the coordinates (X, Y) in the plane of the projection screen 30 of each of the shadows cast of said pattern, and it calculates the distance E between them. The angle A1 is then obtained by applying the following formula:

$$A1 = a\tan(E/L)$$

The angle A1 is preferably greater than or equal to 5 degrees.

By way of example, each image is picked up with any type of sensor, and is then digitized.

Each image is in the form of a matrix of pixels of known coordinates in the plane of the image, each pixel including information concerning the light intensity received by the sensor on an element of the base surface thereof.

A captured image is processed for the purpose of determining the coordinates (Xi, Yi) where i=1A, 2A, 3A, 1B, 2B, or 3B of the shadows 31A, 32A, 33A, 31B, 32B, and 33B cast by each mark 51, 52, and 53 of the ophthalmic lens 50, or of the pattern used for calibration in the plane of the projection screen 30, by performing the steps described below, for example. The plane of the projection screen 30 is identified as the image plane.

The computer 60 begins by eliminating pixels of light intensity that is greater than a predetermined threshold value. This serves to eliminate image zones that are lighted directly by one of the light sources 11 and 12 and that do not include the shadows 31A, 32A, 33A, 31B, 32B, or 33B of any of the marks 51, 52, or 53 of the ophthalmic lens 50. The sets of pixels that remain present intensity that is low, indicative of the presence of a shadow on the projection screen 30.

The computer 60 then determines the shape of these sets of remaining pixels and selects from them those that present a shape that corresponds to the shape expected for the shadows of the marks 51, 52, and 53 on the ophthalmic lens 50.

In this example, the marks 51, 52, and 53 are in the form of spots, so their shadows 31A, 32A, 33A, 31B, 32B, and 33B consequently present shapes that are circular or elliptical.

The computer 60 determines the coordinates (XGi, YGi) of the barycenter (or centroid) of each selected set of pixels, and identifies them with the coordinates (Xi, Yi) of each of the shadows 31A, 32A, 33A, 31B, 32B, and 33B in the plane of the projection screen 30. These coordinates (Xi, Yi) give the positions of each of the shadows 31A, 32A, 33A, 31B, 32B, and 33B in the plane of the projection screen 30.

Alternatively, for marks that are not spot-shaped, such as marks of progressive lenses or for frontofocometer measurements, or the outline of the ophthalmic lens or of stickers, the computer selects the non-circular set of pixels presenting the shape expected for the shadows cast by such marks that are not spot-shaped.

The computer 60 then determines the distances E1, E2, and E3 between the pairs of shadows 31A & 31B, 32A & 32B, and 33A & 33B of each mark 51, 52, and 53 lighted in the two lighting directions.

It also verifies that both sets of pixels identified as the shadows 31A & 31B, 32A & 32B, or 33A & 33B cast by a given mark 51, 52, or 53 on each captured image do indeed correspond to the same mark 51, 52, and 53 by verifying that the distance E1, E2, or E3 between the two shadows 31A & 31B, 32A & 32B, or 33A & 33B of a given mark 51, 52, or 53 is less than a predetermined threshold value. The computer 60 also verifies that both sets of pixels present shapes that are similar. Such a computer 60 is described in the book "Digital image processing" by W. K. Pratt, published by Wiley-Intersciences in 2001 (3rd edition), in Chapter 18.2.

The computer 60 calculates the heights Z1, Z2, and Z3 between the screen 30 and each of the marks 51, 52, and 53, which heights are equal to the distances E1, E2, and E3 between the pairs of shadows 31A & 31B, 32A & 32B, and 33A & 33B of the marks 51, 52, and 53 divided by the tangent of the angle A1 between the two lighting directions. In other words:

$$Zr = Er/\tan(A1), \text{ with } r = 1, 2, 3$$

Knowing the heights Z1, Z2, Z3 of the marks 51, 52, and 53 of the ophthalmic lens 50, the computer 60 deduces therefrom at least said camber geometrical characteristic of the ophthalmic lens 50.

To do this, the computer 60 determines the radius of curvature Rav of the front face 55 of the ophthalmic lens 50, assuming that the shape of the front face 55 complies with a predetermined model, e.g. that it presents a shape that is spherical.

The camber Bav of the front face 55 of the ophthalmic lens 50 can then be obtained from the radius of curvature Rav by using the formula:

$$Bav = (n-1)/Rav$$

where n is the reference refractive index. By way of example, the refractive index n of the ophthalmic lens 50 may be equal to 1.53 or 1.523.

In a first implementation of the method using the above-described device, as shown in the figures, the ophthalmic lens 50 is provided with three said marks 51, 52, and 53 in alignment on a meridian of the ophthalmic lens 50. The front face 55 of the ophthalmic lens 50 in this example presents a shape that is spherical, so the three marks 51, 52, and 53 are situated on a sphere of radius equal to the radius of curvature Rav of the front face 55 of the ophthalmic lens 50 and of center C having coordinates (XC, YC, ZC). The coordinates (X1, Y1, Z1), (X2, Y2, Z2), and (X3, Y3, Z3) of the marks 51, 52, and 53 thus satisfy the following equations:

$$(X1-XC)^2+(Y1-YC)^2+(Z1-ZC)^2=Rav^2$$

$$(X2-XC)^2+(Y2-YC)^2+(Z2-ZC)^2=Rav^2$$

$$(X3-XC)^2+(Y3-YC)^2+(Z3-ZC)^2=Rav^2$$

Furthermore, since the three marks 51, 52, and 53 are in alignment on a meridian, their coordinates in the plane of the projection screen 30 also satisfy the following equation:

$$(X1-X2)(Y2-Y3)-(Y1-Y2)(X2-X3)=0$$

To determine the radius of curvature Rav of the front face 55 of the ophthalmic lens 50, the computer 60 solves this system of four equations with four unknowns, thereby enabling the coordinates XC, YC, and ZC of the center of the sphere to be calculated, and also enabling its radius of curvature Rav to be calculated. Thereafter it deduces the camber Bav of the front face 55 of the ophthalmic lens 50.

In a variant, the lens may be provided with some other number of marks.

For example, in a second implementation of said method, the front face of the ophthalmic lens is provided with a single mark. This mark is then located close to the top of the lens or to the center of its outline.

The coordinates (Xa, Ya, Za) of this mark, and thus the top of the ophthalmic lens, are determined by the computer using the method as described above.

Since the height ZS of the support of the ophthalmic lens relative to the projection screen is known by construction, with an ophthalmic lens of outline that is circular in shape and of radius RL, as applies to a presentation ophthalmic lens, the radius of curvature Rav of the front face of the ophthalmic lens satisfies the following equation:

$$[Rav-(Za-ZS)]^2+RL^2=Rav^2$$

The radius of curvature Rav of the front face of the ophthalmic lens is calculated by the computer using the following formula:

$$Rav=[(Za-ZS)^2+RL^2]/(Za-ZS)$$

In a third implementation of said method, the front face of the lens is provided with two marks of coordinates written (Xa, Ya, Za) and (Xb, Yb, Zb), with one of the two marks being disposed at the top of the ophthalmic lens and the other in an arbitrary position.

The coordinates (Xa, Ya, Za) and (Xb, Yb, Zb) of these two marks are determined by the computer using the above method. Thereafter the computer calculates the radius of curvature Rav of the front face of the spherical ophthalmic lens using the following formula:

$$Rav=[(Za-Zb)^2+(Xa-Xb)^2+(Ya-Yb)^2]/(Za-Zb)$$

In a fourth implementation of said method, the front face of the ophthalmic lens is provided with four arbitrary marks that are not in alignment. The coordinates (X1, Y1, Z1), (X2, Y2, Z2), (X3, Y3, Z3), and (X4, Y4, Z4) of these marks then satisfy the following system of four equations in four unknowns:

$$(X1-XC)^2+(Y1-YC)^2+(Z1-ZC)^2=Rav^2$$

$$(X2-XC)^2+(Y2-YC)^2+(Z2-ZC)^2=Rav^2$$

$$(X3-XC)^2+(Y3-YC)^2+(Z3-ZC)^2=Rav^2$$

$$(X4-XC)^2+(Y4-YC)^2+(Z4-ZC)^2=Rav^2$$

In solving the system, the computer determines the coordinates (XC, YC, ZC) of the center of the sphere occupied by the front face of the ophthalmic lens, and also its radius Rav which is the radius of curvature of said front face.

Finally, in a fifth implementation of said method, the front face of the ophthalmic lens is provided with more than four marks. The computer can then take account of a model for the surface of the front face 55 of the ophthalmic lens that is more appropriate, for example a model that is spherico-cylindrical. The camber of the front face of the ophthalmic lens is then determined more accurately.

The computer 60 is preferably also adapted to calculate the measured value of the camber of the front face of the ophthalmic lens 50 in all five of the above-described implementations, while additionally taking account of the focal power thereof.

The focal power of the ophthalmic lens 50, also referred to as its spherical power or refractive power gives rise to local prismatic deflection of the light rays passing through it, and that can deform and/or offset the shadow 31A, 32A, 33A, 31B, 32B, or 33B of each mark 51, 52, or 53.

By way of example, for an ophthalmic lens 50 of positive focal power, the shadow 31A, 32A, 33A, 31B, 32B, or 33B of a given mark 51, 52, or 53 will be closer to the optical axis of the ophthalmic lens 50 than the corresponding mark 51, 52, or 53. On the contrary, if the ophthalmic lens 50 presents negative focal power, then the shadows will be further away from the optical axis of the ophthalmic lens 50. This offset increases with increasing focal power of the ophthalmic lens 50 and with increasing distance between the optical axis of the ophthalmic lens 50 and the mark in question 51, 52, or 53.

In order to take account of this offset, the coordinates (Xi, Yi, Zi) calculated for each mark 51, 52, or 53 are corrected by the computer 60 as a function of the focal prismatic deflection of the light rays passing by each mark 51, 52, or 53, as described in document WO 2005/093495 or its equivalent US 2007/146687.

In a first embodiment of the method, assuming that the ophthalmic lens is a single vision lens of spherico-cylindrical shape, with the three marks 51, 52, and 53 lying on a common meridian, and with FM being the focal length of said ophthalmic lens along said meridian, equal to the reciprocal of the focal power of said ophthalmic lens along said meridian, then the corrected coordinates (Si, Ti, Ui) with i=1A, 2A, 3A, 1B, 2B, and 3B for each of the shadows 31A, 32A, 33A, 31B, 32B, and 33B are calculated using the following formulae:

$$Si=Xi*FM/(FM-Zi)$$

$$Ti=Yi*FM/(FM-Zi)$$

$$Ui=Zi$$

In this example, the optical center of the ophthalmic lens 50 presents coordinates of zero.

The computer 60 determines the radius of curvature Rav and thus the camber Bav of the front face 55 of the ophthalmic lens 50 using the first above-described implementation of the method, but with greater accuracy since the coordinates of the shadows 31A, 32A, 33A, 31B, 32B, and 33B are more accurate.

In the other implementations of the method, where the ophthalmic lens is provided with marks that are not in alignment on a common meridian, the computer 60 determines the corrected coordinates for each of the marks using the above formulae in which the focal length FM of the ophthalmic lens along the meridian passing through the three marks when they are aligned on a common meridian is replaced by the local focal length FMi of the ophthalmic lens along the meridian passing through the corresponding mark.

The local focal length FMi of the ophthalmic lens on one of the meridians under consideration can be determined automatically by means of an optical measurement, e.g. with the help of a matrix of patterns present on the ophthalmic lens support, as described in document FR 2 878 979 or in its equivalent US 2007/273870, or it can be input manually, or it can be obtained from a database.

In a variant, in order to correct the local prismatic deflection by the ophthalmic lens 50 of light rays passing by each mark 51, 52, and 53, the computer 60 may perform the steps described below. They are described herein for the first implementation of the method.

The computer 60 models the front face 55 of the ophthalmic lens 50 as a spherical surface S1 of radius of curvature Rav corresponding to the radius of curvature Rav as determined by the above-described first implementation of the method. The rear face 56 is modeled by a spherico-cylindrical surface S2 of radius of curvature written Rar.

These two surfaces S1 and S2 are separated by a thickness EC at the center of the ophthalmic lens 50. The lens is made of a material having a refractive index n. The parameters EC and n of this model of the ophthalmic lens 50 may be determined automatically by means of an optical measurement, or they may be input manually by the optician, or they may be obtained from a database.

The local power Plens of the ophthalmic lens 50 on the meridian passing through the three marks 51, 52, and 53 of its front face 55 is measured for example by the Hartmann method, as described in document WO 2005/093495 or its equivalent US 2007/146687, but it could also be input manually by the optician or obtained from a database.

This focal power Plens satisfies the following equation:

$$Plens=Bav+Bar-EC/n*Bav*Bar$$

where Bav=(n−1)/Rav and Bar=(n−1)/Rar, respectively designating the cambers of the front face 55 and of the rear face 56 of the ophthalmic lens 50.

The computer 60 uses the value for the radius of curvature Rav of the front face 55 of the ophthalmic lens 50 as determined by the above-described first implementation in order to calculate Bav and then Bar and Rar using the fowling formulae:

$$Bar=(Plens-Bav)/(1-(EC/n)*Bav)$$

$$Rar=(n-1)/Bar$$

The computer 60 then calculates the path of the light rays that are emitted by at least one of the two light sources 11 and 12 passing through the ophthalmic lens 50 as modeled in this way and passing via the shadows 31A, 32A, 32C, 31B, 32B, and 32C projected onto the projection screen 30 by using a light ray tracing method that is well known to the person skilled in the art. The computer 60 deduces therefrom new values for the coordinates (Xi, Yi, Zi) of the marks 51, 52, and 53 on the front face 55 of the ophthalmic lens 50 that are more accurate.

Thereafter, the computer 60 recalculates the radius of curvature Rav and the camber Bav of the front face 55 of the ophthalmic lens 50 using the first implementation of the method with these new more accurate values for the coordinates of the marks 51, 52, and 53. The new value obtained for the camber is then more accurate.

Naturally, the steps of this variant may be repeated some given number of times in order to increase progressively the accuracy of the value determined in this way for the camber of the front face.

The steps of this variant may also be adapted to improve the accuracy of the value of the radius of curvature Rav of the front face of the ophthalmic lens as determined by the other above-described implementations of the method.

Thereafter, the computer 60 compares the measured value of the camber Bav of the front face 55 of the ophthalmic lens 50 with a predetermined value.

The device 100 includes visible and/or audible warning means that are activated by the computer 60 when said comparison reveals a difference between the measured and predetermined values that is greater than a predetermined threshold.

Said predetermined value may correspond to the camber expected for the front face 55 of the ophthalmic lens 50 (e.g. the camber specified by the manufacturer, or the camber ordered by the optician) or to the camber of the eyeglass frame on which the ophthalmic lens 50 is to be mounted.

Under such circumstances, the predetermined threshold beyond which a warning is issued is determined as a function of the capacity of the frame or of the ophthalmic lens to absorb the difference of camber between the ophthalmic lens and the frame.

For example, when the frame has metal portions making it relatively undeformable, a warning signal is issued for a camber difference that is relatively small and the predetermined threshold is small. For a frame presenting greater flexibility, such as frames made of plastics material or pierced frames, then the predetermined threshold is higher.

More generally, for each type of frame (pierced, grooved, rimmed) and for each type of frame material, the maximum permitted camber difference is defined, thereby defining the predetermined threshold beyond which a warning is issued.

This comparison is performed automatically by the computer 60 that, for example, includes a database storing the camber of the front face 55 of the ophthalmic lens 50 as specified by the manufacturer, as ordered by the optician, or as presented by the selected frame.

The comparison may also be made by the optician. Under such circumstances, the device 100 includes display means on which it displays, for example, the camber of the front face 55 of the ophthalmic lens 50 as measured together with said predetermined value.

In a variant, the mark(s) of the ophthalmic lens may be located on the rear face of the ophthalmic lens. The steps of the implementation of the method of the invention are unchanged, but it is the radius of curvature and the camber of the rear face of the ophthalmic lens that are then determined.

For a presentation ophthalmic lens, the cambers of the front and rear faces of the lens are identical, whereas for an ophthalmic lens that presents a focal power, the cambers of the front and rear faces are different.

Knowledge of the camber of the ophthalmic lens makes it possible to determine accurately the positions of drill holes in the surface of said ophthalmic lens when it is to be mounted in a pierced type frame. This serves to improve the positioning of the holes when the ophthalmic lens is drilled.

Knowledge of the camber of the ophthalmic lens also makes it possible to improve the accuracy of centering, with the camber being taken into account in order to determine the position of the centering point of the ophthalmic lens in the frame.

Finally, such knowledge also makes it possible to improve the accuracy with which a handler grip is positioned on the lens, e.g. by controlling the way it is put into place so their positioning errors associated with the camber are corrected, or by controlling the grinder so that these errors are compensated while the ophthalmic lens is being shaped. This handler grip is used in a subsequent fabrication step to drive the lens in rotation so that it can be machined.

In a variant, it is possible to light the ophthalmic lens with its marks by means of an extended light source with a characteristic dimension that is preferably greater than or equal to 5 millimeters. For example, it is possible to use a source that is of annular shape.

Finally, other geometrical characteristics of the ophthalmic lens may be determined by the device and the method of the invention.

The invention claimed is:

1. A device for measuring at least one camber geometrical characteristic of an ophthalmic lens provided on at least one face with at least one position-identifying mark, the device comprising:
    a support for said ophthalmic lens, and
    on opposite sides of said support, firstly lighting means for lighting said ophthalmic lens along at least two different incident lighting directions, and secondly acquisition and analysis means for acquiring and analyzing the light transmitted by said ophthalmic lens, said analysis means being adapted to identify shadows of said mark when lighted in said at least two incident lighting directions, and to deduce from the positions of said shadows of said mark a measured value for said camber geometrical characteristic of the ophthalmic lens.

2. The device according to claim 1, including a projection screen and in which said acquisition and analysis means are adapted to identify shadows of said at least one mark projected on said projection screen and to deduce from the positions of said shadows the measured value of said camber geometrical characteristic.

3. The device according to claim 1, wherein said lighting means include at least two point light sources.

4. The device according to claim 3, wherein each of said point light sources is collimated to form a light beam oriented along one of said lighting directions.

5. The device according to claim 1, wherein said lighting means comprise a single light source with a characteristic dimension greater than 5 millimeters.

6. The device according to claim 1, wherein the acquisition and analysis means are adapted to calculate the measured value of the camber geometrical characteristic as a function of the refractive power of the ophthalmic lens along a meridian of said ophthalmic lens passing via said mark.

7. The device according to claim 1, wherein the acquisition and analysis means are adapted to compare said measured value of the camber geometrical characteristic of the ophthalmic lens with a predetermined value.

8. The device according to claim 7, including warning means that are activated when said comparison shows a difference between said measured and predetermined values that exceeds a predetermined threshold.

9. A method of measuring at least one camber geometrical characteristic of an ophthalmic lens, the method comprising the following steps:

provide said ophthalmic lens with at least one position-identifying mark;

lighting said ophthalmic lens along at least two different incident lighting directions;

acquiring shadows of the marks on said at least two incident lighting directions; and deducing from the positions of said shadow of said mark a measured value for said camber geometrical characteristic of the ophthalmic lens.

10. The method according to claim 9, wherein the shadows of said at least one mark are formed on a projection screen, and wherein the measured value of said camber geometrical characteristic of the ophthalmic lens is deduced from the positions of said shadows.

11. The method according to claim 9, wherein said ophthalmic lens is provided with at least one mark situated at the top of said ophthalmic lens or at the center of its outline.

12. The method according to claim 9, wherein said ophthalmic lens is provided with three marks in alignment on a meridian thereof.

13. The method according to claim 9, wherein said ophthalmic lens is provided with at least four marks in arbitrary positions.

14. The method according to claim 9, including the following steps:

comparing the measured value for said camber geometrical characteristic with a predetermined value; and issuing a warning signal when said comparison reveals a difference between the measured and predetermined values that is greater than a predetermined threshold.

15. A device for measuring at least one camber geometrical characteristic of an ophthalmic lens provided on at least one face with at least one position-identifying mark, the device comprising:

a support for said ophthalmic lens, and on opposite sides of said support, firstly at least one light source for lighting said ophthalmic lens along at least two different incident lighting directions, and secondly a camera associated with a computer configured for acquiring and analyzing the light transmitted by said ophthalmic lens, said camera associated with the computer being adapted to identify shadows of said mark when lighted in said at least two incident lighting directions, and to deduce from the positions of said shadow of said mark a measured value for said camber geometrical characteristic of the ophthalmic lens.

16. The device according to claim 15, including a projection screen and in which said camera associated with the computer are adapted to identify shadows of said at least one mark projected on said projection screen and to deduce from the positions of said shadows the measured value of said camber geometrical characteristic.

17. The device according to claim 15, wherein said at least one light source includes at least two point light sources.

18. The device according to claim 17, wherein each of said point light sources is collimated to form a light beam oriented along one of said lighting directions.

19. The device according to claim 15, wherein said at least one light source comprises a single light source with a characteristic dimension greater than 5 millimeters.

20. The device according to claim 15, wherein the camera associated with the computer are adapted to calculate the measured value of the camber geometrical characteristic as a function of the refractive power of the ophthalmic lens along a meridian of said ophthalmic lens passing via said mark.

* * * * *